(12) United States Patent  
Minami et al.

(10) Patent No.: US 11,192,285 B2  
(45) Date of Patent: Dec. 7, 2021

(54) MOLDING METHOD OF CONNECTOR PORTION

(71) Applicants: TOYOTA JIDOSHA KABUSHIKI KAISHA, Toyota (JP); SUMITOMO WIRING SYSTEMS, LTD., Yokkaichi (JP); SUMITOMO ELECTRIC INDUSTRIES, LTD., Osaka (JP); AUTONETWORKS TECHNOLOGIES, LTD., Yokkaichi (JP)

(72) Inventors: Shoichi Minami, Miyoshi (JP); Koichi Yokotani, Yokkaichi (JP); Nobunori Koga, Yokkaichi (JP)

(73) Assignees: TOYOTA JIDOSHA KABUSHIKI KAISHA, Toyota (JP); SUMITOMO WIRING SYSTEMS, LTD., Mie (JP); SUMITOMO ELECTRIC INDUSTRIES, LTD., Osaka (JP); AUTONETWORKS TECHNOLOGIES, LTD., Mie (JP)

( * ) Notice: Subject to any disclaimer, the term of this patent is extended or adjusted under 35 U.S.C. 154(b) by 0 days.

(21) Appl. No.: 16/811,508

(22) Filed: Mar. 6, 2020

(65) Prior Publication Data

US 2020/0282613 A1     Sep. 10, 2020

(30) Foreign Application Priority Data

Mar. 6, 2019   (JP) .............................. JP2019-040988

(51) Int. Cl.
*B29C 45/14* (2006.01)
*B29K 77/00* (2006.01)
*B29L 31/34* (2006.01)

(52) U.S. Cl.
CPC .. *B29C 45/14639* (2013.01); *B29C 45/14426* (2013.01); *B29K 2077/00* (2013.01); *B29L 2031/3462* (2013.01)

(58) Field of Classification Search
None
See application file for complete search history.

(56) References Cited

U.S. PATENT DOCUMENTS 2,700,206 A  *  1/1955  Margaret ............... H01R 43/24  
                                                    29/858  
3,044,127 A  *  7/1962  Alden ............... B29C 45/14639  
                                                    264/254

(Continued)

FOREIGN PATENT DOCUMENTS

CN         104412453 A        3/2015  
CN         104736311 A        6/2015

(Continued)

*Primary Examiner* — Edmund H Lee  
(74) *Attorney, Agent, or Firm* — Oliff PLC

(57) ABSTRACT

A molding method of a connector portion including an electric wire with a core wire, a terminal metal fitting and a mold portion, the molding method of insert-molding the mold portion with a plurality of molding dies forming a cavity corresponding to the mold portion, includes an injection step of closing the molding dies so that the insulating coating is compressed and deformed and injecting and filling a mold resin as a synthetic resin material of the mold portion into the cavity; and a mold opening step of separating the molding die in a mold opening direction while the mold resin has fluidity so that leakage of the mold resin is prevented by an elastic return pressure of the insulating coating.

6 Claims, 6 Drawing Sheets

(56) References Cited

U.S. PATENT DOCUMENTS

| | | | | |
|---|---|---|---|---|
| 3,238,286 A * | 3/1966 | Davis | H01F 41/10 | |
| | | | 264/272.19 | |
| 4,339,407 A * | 7/1982 | Leighton | B29C 45/14065 | |
| | | | 249/91 | |
| 4,574,474 A * | 3/1986 | Langham | B29C 45/14639 | |
| | | | 264/272.15 | |
| 5,306,459 A * | 4/1994 | Thomason | B29C 45/14418 | |
| | | | 264/266 | |
| 6,230,405 B1 * | 5/2001 | Liu | H01R 13/405 | |
| | | | 264/255 | |
| 9,281,101 B2 * | 3/2016 | Tachi | B29C 45/14639 | |
| 9,831,590 B2 * | 11/2017 | Onimoto | H01R 13/405 | |
| 2001/0003688 A1 * | 6/2001 | Kondo | B29C 45/14426 | |
| | | | 439/604 | |
| 2012/0040571 A1 * | 2/2012 | Yoshioka | H01R 43/24 | |
| | | | 439/736 | |
| 2012/0074613 A1 * | 3/2012 | Hellberg | B29C 45/14426 | |
| | | | 264/275 | |
| 2015/0091206 A1 * | 4/2015 | Sato | B29C 45/14065 | |
| | | | 264/229 | |
| 2015/0283767 A1 | 10/2015 | Renkl et al. | | |
| 2017/0201033 A1 * | 7/2017 | Shimizu | H01R 13/405 | |
| 2018/0076537 A1 * | 3/2018 | Kim | H01R 43/24 | |

FOREIGN PATENT DOCUMENTS

| | | |
|---|---|---|
| JP | 2015-135761 A | 7/2015 |
| JP | 2015-156353 A | 8/2015 |

\* cited by examiner

MOLD CLOSING STEP

INJECTION STEP

FIRST INTERMEDIATE MOLD OPENING STEP

SECOND INTERMEDIATE MOLD OPENING STEP

COMPLETE MOLD OPENING STEP

MOLDING METHOD OF CONNECTOR PORTION

This application claims priority from Japanese Patent Application No. 2019-040988 filed on Mar. 6, 2019, the disclosure of which is herein incorporated by reference in its entirety.

FIELD OF THE INVENTION

The present invention relates to a connector portion and, more particularly, to a technique of molding a mold portion covering a joining portion between an electric wire and a terminal metal fitting.

DESCRIPTION OF THE RELATED ART

A widely known connector portion includes (a) an electric wire with a core wire covered with an insulating coating made of a synthetic resin such that a tip of the core wire projects from the insulating coating, (b) a terminal metal fitting electrically joined to the core wire projecting from the insulating coating, and (c) a mold portion made of a synthetic resin disposed on both the electric wire and the terminal metal fitting to enclose a joining portion between the core wire and the terminal metal fitting and covering the joining portion. A connector portion of a wire harness described in Patent Document 1 is an example thereof, and a cylindrical protective member is disposed on the entire circumference of the electric wire at a boundary portion where the electric wire extends from the mold portion, so that an end portion of the mold portion is prevented from biting into the insulating coating of the electric wire.

PRIOR ART DOCUMENT

Patent Document

Patent Document 1: Japanese Laid-Open Patent Publication No. 2015-135761

SUMMARY OF THE INVENTION

Technical Problem

However, when the mold portion is molded such that the protective member is attached as in Patent Document 1, increases in the number of parts and the number of processes cause a problem of increased manufacturing costs.

The present invention was conceived in view of the situations and it is therefore an object of the present invention to restrain an end portion of a mold portion insert-molded around an electric wire from biting in an edge shape into an insulating coating of the electric wire without using a protective member preventing the end portion of the mold portion from biting.

Solution to Problem

To achieve the above object, a first aspect of the present invention provides a molding method of a connector portion related to the connector portion including (a) an electric wire with a core wire covered with an insulating coating made of a synthetic resin such that a tip of the core wire projects from the insulating coating, (b) a terminal metal fitting electrically joined to the core wire projecting from the insulating coating, and (c) a mold portion made of a synthetic resin disposed on both the electric wire and the terminal metal fitting to enclose a joining portion between the core wire and the terminal metal fitting and covering the joining portion, (d) the molding method of insert-molding the mold portion with a plurality of molding dies forming a cavity corresponding to the mold portion, the method comprising: (e) an injection step of closing the molding dies so that the insulating coating is compressed and deformed and injecting and filling a mold resin as a synthetic resin material of the mold portion into the cavity; and (f) a mold opening step of separating the molding die in a mold opening direction while the mold resin has fluidity so that leakage of the mold resin is prevented by an elastic return pressure of the insulating coating.

A second aspect of the present invention provides the molding method of the connector portion recited in the first aspect of the invention, wherein the mold opening step includes (a) an intermediate mold opening step of separating the molding die to an intermediate position in the mold opening direction while the mold resin has fluidity so that the insulating coating is elastically returned by a predetermined amount from the compression deformation state at the injection step, and (b) a complete mold opening step of opening the molding die until the insulating coating is completely elastically returned after the mold resin cures and becomes unable to flow.

A third aspect of the present invention provides the molding method of the connector portion recited in the second aspect of the invention, wherein a plurality of intermediate positions are defined for the intermediate mold opening step, and wherein the molding die is separated stepwise at the plurality of intermediate positions.

A fourth aspect of the present invention provides the molding method of the connector portion recited in the second or third aspect of the invention, wherein the intermediate position and a timing of separating the molding die to the intermediate position are determined based on an elapsed time and a temperature decrease characteristic that is a relationship between a temperature of the mold resin and the elapsed time.

A fifth aspect of the present invention provides the molding method of the connector portion recited in any one of the first to fourth aspects of the invention, wherein (a) the molding dies are made up of a pair of fixed and movable dies, wherein (b) in a closed state of the fixed die and the movable die, a compression deformation amount of the insulating coating is smaller in the vicinity of die mating surfaces of the fixed die and the movable die as compared to the other portions.

A sixth aspect of the present invention provides the molding method of the connector portion recited in any one of the first to fifth aspects of the invention, wherein (a) the connector portion includes a plurality of the electric wires joined to the respective terminal metal fittings, and wherein (b) the mold portion is disposed on both the plurality of electric wires and the terminal metal fittings to collectively cover a plurality of joining portions of the plurality of electric wires.

Advantageous Effects of Invention

In the molding method of the connector portion as described above, when the molding dies are closed so that the insulating coating is compressed and deformed, and the mold resin is injected and filled into the cavity, the mold resin bites in an edge shape toward the inner circumference at a boundary portion between the portion of clamping by the molding dies and the cavity; however, subsequently, the molding die is separated in the mold opening direction while the mold resin has fluidity, so that the biting portion of the mold resin is pushed back by the elastic return pressure of the insulating coating due to the separation of the molding die. As a result, when the molding die is completely separated to the mold opening position and the insulating coating is completely elastically returned, the biting is mitigated at the end portion of the mold portion, and the strength deterioration of the insulating coating due to the biting of the mold portion is suppressed. Additionally, the molding die is separated in the mold opening direction such that the leakage of the mold resin is prevented by the elastic return pressure of the insulating coating, which eliminates the risk of leakage of the mold resin from between the molding dies and the insulating coating.

In the second aspect of the invention, the method includes the intermediate mold opening step of separating the molding die to the intermediate position in the mold opening direction so that the insulating coating is elastically returned by the predetermined amount from the compression deformation state at the injection step while the mold resin has fluidity, and the complete mold opening step of opening the molding die until the insulating coating is completely elastically returned after the mold resin cures and becomes unable to flow. Since the biting portion of the mold resin is pushed back at the intermediate mold opening step, the strength deterioration of the insulating coating due to the biting of the mold portion is appropriately suppressed. In this case, after the molding die is separated continuously or stepwise to the intermediate position, the complete mold opening step may be performed after the mold resin cures and becomes unable to flow, and therefore, movement control or operation of the molding die is easy.

In the third aspect of the invention, the intermediate position of the intermediate mold opening step is defined as one of the plurality of intermediate positions, and the molding die is separated stepwise to the plurality of intermediate positions. Therefore, the molding die can be separated step by step from when the mold resin is relatively highly fluid (soft) such that leakage is prevented, so that the biting portion of the mold resin can reliably be pushed back by the elastic return pressure of the insulating coating. Since the molding die is moved stepwise after waiting for curing to a certain degree so as not to allow the mold resin to leak out, a flatness of an end surface of the mold portion is increased on the tip side from which the terminal metal fitting projects, as compared to when the molding die is continuously separated. Since the end surface of the mold portion on the tip side is exposed to the outside up to an inner circumferential edge in contact with the terminal metal fitting, the quality is improved by increasing the flatness.

In the fourth aspect of the invention, the intermediate position and the timing of separating the molding die to the intermediate position are determined from the elapsed time based on the temperature decrease characteristic of the mold resin. Therefore, it is not necessary to measure the temperature of the mold resin in the cavity, and the molding die may be separated to predetermined intermediate positions at predetermined timing at which the mold resin does not leak based on the elapsed time, so that the molding die can simply be moved. Specifically, the fluidity of the mold resin and a leakage prevention required pressure depend on the temperature of the mold resin, and the leakage prevention of the mold resin depends on the elastic return pressure of the insulating coating, i.e., the separation position of the molding die, while the temperature of the mold resin changes depending on the elapsed time, the molding die can be moved based on the elapsed time while preventing the mold resin from leaking.

In the fifth aspect of the invention, the molding dies are made up of the pair of fixed die and movable die. In the vicinities of the die mating surfaces of the fixed die and the movable die, the elastic return amount (diameter expansion amount) of the insulating coating in radial directions perpendicular to the movement direction of the movable die is smaller as compared to a movement stroke of the movable die in the initial stage of separation of the movable die from the mold closing state. Therefore, a push-back amount of the insulating coating pushing back the biting portion of the mold resin due to the elastic return pressure is small, so that the biting cannot sufficiently be mitigated. However, in the fifth aspect of the invention, the compression deformation amount of the insulating coating near the die mating surfaces is smaller as compared to the other portions, and even if the push-back amount of the insulating coating due to the elastic return pressure is small, a predetermined strength can be ensured for the insulating coating.

In the sixth aspect of the invention, the connector portion includes the electric wire as one of the plurality of electric wires each joined to the terminal metal fitting, and the mold portion is disposed on both the plurality of electric wires and the terminal metal fittings to collectively cover the plurality of joining portions of the plurality of electric wires. The present invention is preferably applied to a wire harness etc. for collectively wiring multiple electric wires.

MODES FOR CARRYING OUT THE INVENTION

Multiple molding dies for insert molding of a mold portion are made up of, for example, a pair of fixed and movable dies; however, the dies can be made up of three or more molding dies, and two or more molding dies can each be moved in a mold opening direction (radial direction) away from a center line of the mold portion. A mold opening step of separating the molding dies in a manner preventing a leakage of a mold resin is performed such that the molding die is moved stepwise, for example; however, the molding die may continuously be moved at a predetermined speed. The position, timing of the molding die separated stepwise, or the moving speed of the molding die moved continuously can be determined based on a mold resin temperature decrease characteristic that is a relationship between a mold resin temperature and an elapsed time. Specifically, since a mold resin temperature, and thus a mold resin fluidity, and a leakage prevention required pressure can be estimated from the elapsed time from injection and filling of the mold resin into a cavity, the molding die can be separated based on the elapsed time such that the leakage of the mold resin is prevented. Alternatively, while the temperature of the mold resin in the cavity is measured, the molding die can be separated based on the mold resin temperature such that the leakage of the mold resin is prevented.

The temperature decrease characteristic of the mold resin can be obtained in advance through an experiment etc. This temperature decrease characteristic varies depending on a type of the mold resin as well as the mold resin temperature and a molding die temperature at the time of injection into the cavity, and therefore, multiple characteristics are desirably set by using the mold resin temperature and the molding die temperature at the time of injection as parameters. If the mold resin temperature and the molding die temperature at the time of injection are always constant, it is not necessary to define multiple temperature decrease characteristics, and the molding die can be separated based on a single temperature decrease characteristic such that the leakage of the mold resin is prevented.

EXAMPLES

Examples of the present invention will now be described in detail with reference to the drawings. In the following example, the figures are simplified or deformed as needed for description, and portions are not necessarily precisely drawn in terms of dimension ratio, shape, etc.

Figure 1:
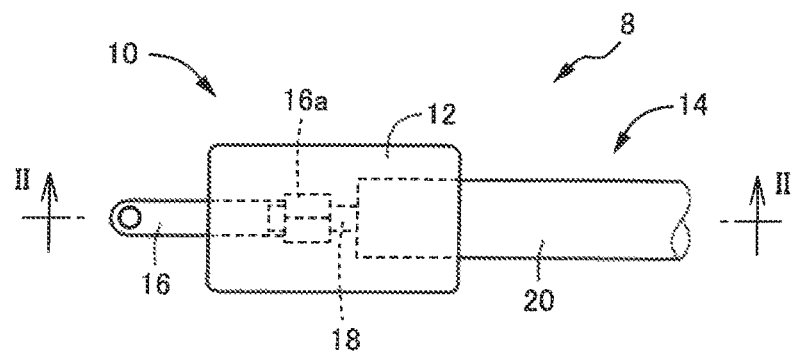
FIG. 1 is a plan view for explaining an example of a connector portion provided with a mold portion in accordance with a method of the present invention.
Figure 2:
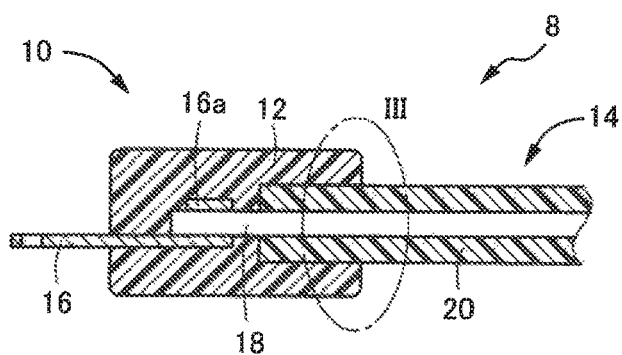
FIG. 2 is a cross-sectional view of the connector portion taken along a line II-II in a longitudinal direction of an electric wire and viewed in a direction of arrows of FIG. 1.
Figure 3:
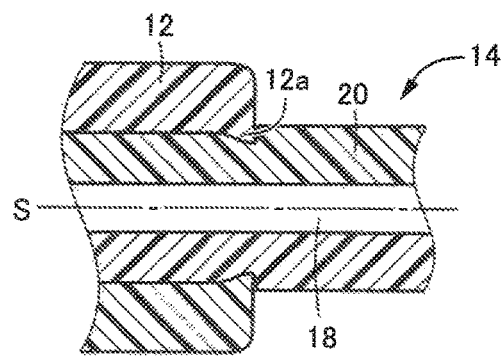
FIG. 3 is an enlarged cross-sectional view of a portion III, i.e., a portion where the electric wire extends from a mold portion, of FIG. 2.
Figure 4:
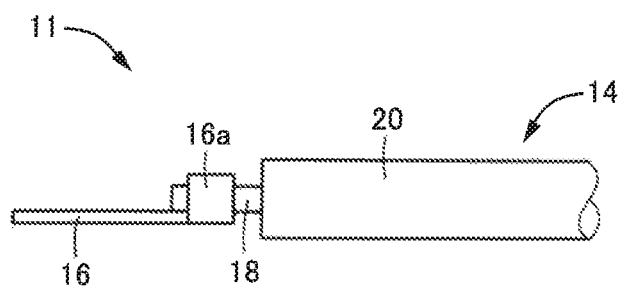
FIG. 4 is a front view of the connector portion before the mold portion is disposed, i.e., a state in Which a terminal metal fitting is joined to a tip of the electric wire.

FIG. 1 is a plan view for explaining an example of a wire harness 8 having a connector portion 10 provided with a mold portion 12 in accordance with a method of the present invention. FIG. 2 is a II-II cross-sectional view of the connector portion 10 taken along a dash and dot line in a longitudinal direction of an electric wire 14 of the connector portion 10 and viewed in a direction of arrows II of FIG. 1, and FIG. 3 is an enlarged cross-sectional view of a portion III, i.e., a portion where the electric wire 14 extends from the mold portion 12, of FIG. 2. FIG. 4 is a front view of a pre-mold connector portion 11 before the mold portion 12 is disposed, i.e., a state in which a terminal metal fitting 16 is joined to a tip of the electric wire 14, and is a view from the lower side of the drawing of FIG. 1.

The wire harness 8 is mainly made up of the one electric wire 14. The electric wire 14 has a core wire 18 covered with an insulating coating 20 made of a synthetic resin such that a tip of the core wire 18 projects from the insulating coating 20, and the terminal metal fitting 16 is electrically joined to the projecting tip. The terminal metal fitting 16 includes a crimping portion 16a, and the crimping portion 16a is crimped and attached to the core wire 18. The terminal metal fitting 16 may be joined by soldering, welding, etc. to the core wire 18. The mold portion 12 made of a synthetic resin is disposed on both the electric wire 14 and the terminal metal fitting 16 to enclose the crimping portion 16a, i.e., a joining portion of the core wire 18 and the terminal metal fitting 16, so that the vicinity of the crimping portion 16a is covered with the mold portion 12. The mold portion 12 is disposed by insert molding so as to be in close contact with surfaces of the electric wire 14 and the terminal metal fittings 16 including the crimping portion 16a. The mold portion 12 is disposed for providing waterproofing as well as insulation protection of the crimping portion 16a, for example, or may be disposed for either purpose or for other purposes. Type or shape of the synthetic resin material can be determined depending on the purpose. In this example, the mold portion 12 is disposed to form a substantially cylindrical shape concentrically with the electric wire 14, so that a straight line S of FIG. 3 is a common center line of the mold portion 12 and the electric wire 14, or the mold portion 12 may be disposed such that the center lines of both are shifted from each other, may have a cross section of a different shape other than the cylindrical shape such as a quadrangular cross section, and can have other various forms.

A wire suitably used as the core wire 18 of the electric wire 14 is a stranded wire obtained by twisting a number of thin wires made of a conductor such as copper or aluminum, or a relatively thick single wire. For the insulating coating 20, for example, a synthetic resin such as polyethylene, vinyl chloride, or polyamide-based nylon is suitably used. A fitting suitably used as the terminal metal fitting 16 is obtained by plating a surface of a conductive metal plate of copper, copper alloy, etc. with Sn (tin), Ag (silver), Ni (nickel), etc. If the core wire 18 and the terminal metal fitting 16 are made of different metals, for example, aluminum and a copper plate, respectively, corrosion easily occur when liquid such as water adheres to the joining portion (crimping portion 16a), and therefore, the mold portion 12 is disposed for preventing the corrosion and providing insulation protection. Examples of the synthetic resin material, i.e., a mold resin, suitably used for the mold portion 12 include PPS (polyphenylene sulfide) resins, PPA (polyphthalamide) resins, LCP (liquid crystal polymer) resins, and phenol, polyester, polyamide, and epoxy resins.

Figure 5:
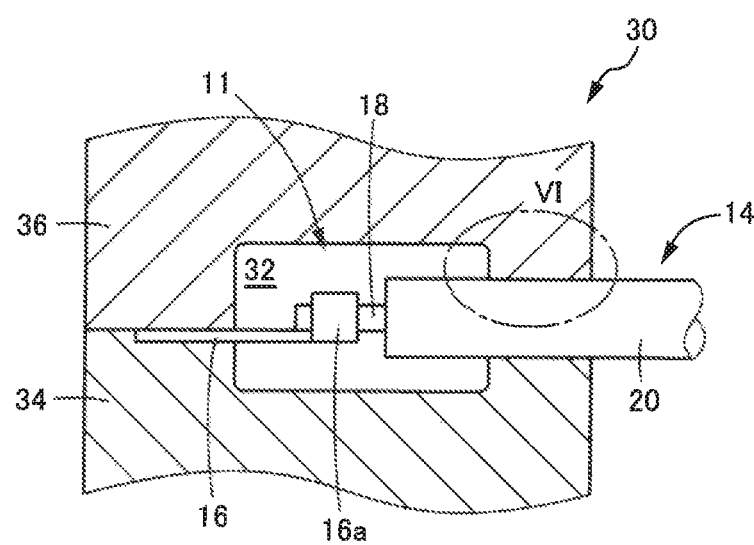
FIG. 5 is a cross-sectional view for explaining molding dies performing insert molding of the mold portion on the connector portion.

FIG. 5 is a cross-sectional view for explaining a molding device 30 performing insert molding of the mold portion 12 on the pre-mold connector portion 11 of FIG. 4. The molding device 30 includes a pair of a fixed die 34 and a movable die 36 (hereinafter simply referred to as the molding dies 34, 36 if the dies are not particularly distinguished) as multiple dies for forming a cavity 32 corresponding to the mold portion 12. The movable die 36 can move upward and downward to separate from and approach to the fixed die 34, and the mold portion 12 is insert-molded in accordance with a procedure shown in FIGS. 6A to 6E. Each of process diagrams of FIG. 6 is an enlarged view of a portion VI of FIG. 5 and is a cross-sectional view of an upper half from the center line S, i.e., a side of the movable die 36, and a side of the fixed die 34, i.e., a lower half of the center line S, forms a vertically symmetrical shape to the side of the movable die 36 shown in FIGS. 6A to 6E.

Figure 6A:
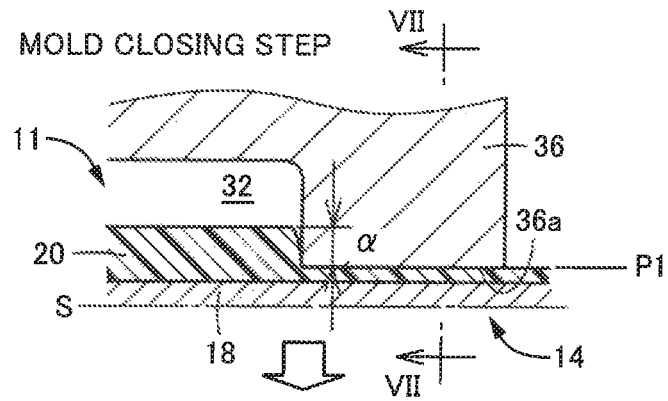
FIG. 6 is a process diagram for explaining multiple steps at the time of insert molding of the mold portion based on a portion VI of FIG. 5.
Figure 6B:
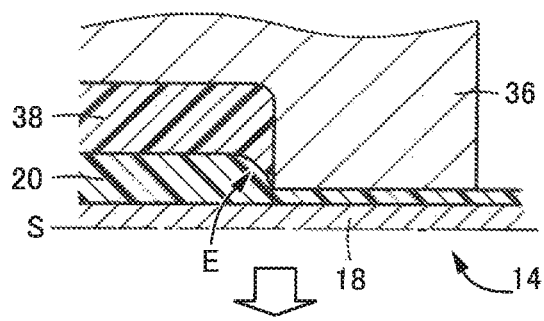
Figure 7:
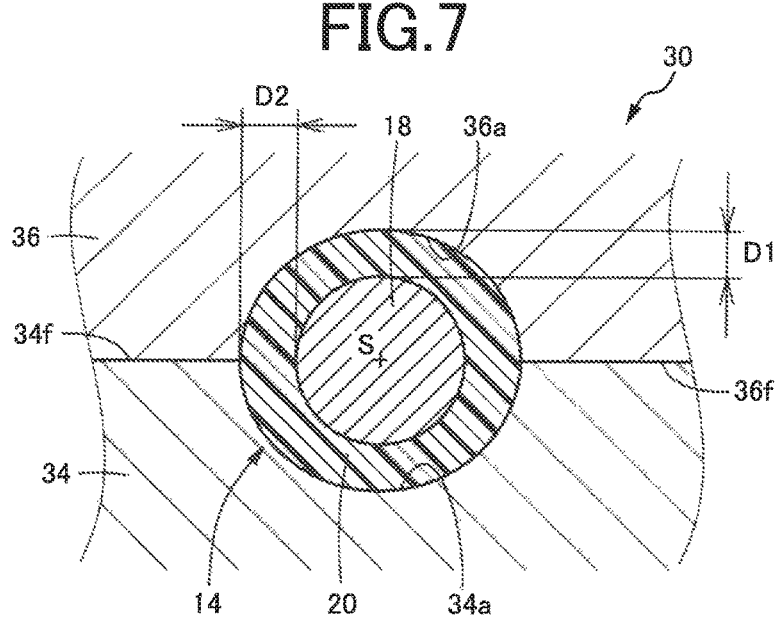
FIG. 7 is a cross-sectional view taken along a line VII-VII and viewed in a direction of arrows of FIG. 6A and is a cross-sectional view perpendicular to a center line S.

At a mold closing step of of FIG. 6A, the movable die 36 is lowered to a mold closing position P1, and the cavity 32 corresponding to the intended mold portion 12 is formed on the outer circumferential side of the pre-mold connector portion 11. At the mold closing position P1, the electric wire 14 is clamped between a clamping surface 34a (see FIG. 7) of the fixed die 34 and a clamping surface 36a of the movable die 36, so that the insulating coating 20 of the electric wire 14 is elastically compressed and deformed. FIG. 7 is a VII-VII cross-sectional view taken along a dash and dot line and viewed in a direction of arrows VII of FIG. 6A and is a cross-sectional view perpendicular to the center line S, and die mating surfaces 34f, 36f of the molding dies 34, 36 are brought in close contact with each other, while the electric wire 14 is clamped between the clamping surfaces 34a, 36a so that the insulating coating 20 is compressed and deformed. Due to an elastic return pressure (repulsive force) generated based on the compression deformation of the insulating coating 20, when the molten mold resin 38 is injected and filled into the cavity 32 at the next injection step of FIG. 6B, the mold resin 38 is prevented from leaking from a boundary between the clamping surfaces 34a, 36a and the insulating coating 20. In other words, a size of an arc shape of the clamping surfaces 34a, 36a of the molding dies 34, 36 clamping the insulating coating 20 is defined such that the insulating coating 20 is compressed and deformed so as not to leak the mold resin 38 in the mold closing state, i.e., a state in which molds are clamped. The elastic return pressure of the insulating coating 20 depends on a compression deformation amount α of the insulating coating 20 and becomes larger as the compression deformation amount α increases. At this injection step, the mold resin 38 elastically deforms the insulating coating 20 and bites in an edge shape toward the inner circumference (the center line S) due to an injection pressure at a boundary portion E between the cavity 32 and a portion of clamping by the molding dies 34, 36 at an end portion in the direction of the center line S.

Figure 6C:
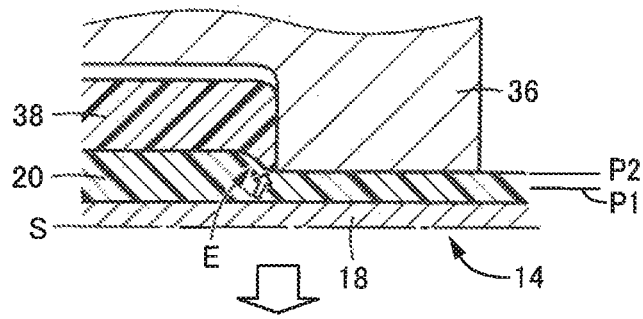

At the next FIG. 6C first intermediate mold opening step and (d) second intermediate mold opening step, while the mold resin 38 still has fluidity, the movable die 36 is moved stepwise upward, i.e., in a mold opening direction, such that the leakage of the mold resin 38 is prevented by the elastic return pressure of the insulating coating 20. Specifically, at the first intermediate mold opening step of FIG. 6C, the movable die 36 is raised to a first intermediate position P2 at a predetermined timing at which the leakage of the mold resin 38 can be prevented by the elastic return pressure of the insulating coating 20, so that the insulating coating 20 is elastically returned (expanded in diameter) by a predetermined amount, and at the second intermediate mold opening step of FIG. 6D, the movable die 36 is further raised to a second intermediate position P3 at a predetermined timing at which the leakage of the mold resin 38 can be prevented by the elastic return pressure of the insulating coating 20, so that the insulating coating 20 is further elastically returned by a predetermined amount. In this case, since the mold resin 38 has fluidity, the edge-shaped biting of the mold resin 38 at the boundary portion E is pushed back as indicated by a white arrow as the insulating coating 20 elastically returns due to raising of the movable die 36, so that the biting is mitigated. Specifically, a biting dimension (a projection dimension toward the inner circumference) is reduced, and a tip shape of the biting (a projection end shape toward the inner circumference) is flattened. Since the insulating coating 20 is elastically returned and expanded in diameter symmetrically on the side of the fixed die 34, the actual raising stroke of the movable die 36 is twice the dimension of each of P1-P2 and P2-P3; however, in the following description, the positional relationship on the side of the movable die 36 will mainly be described. The first intermediate mold opening step and the second intermediate mold opening step correspond to an intermediate mold opening step, and the first intermediate position P2 and the second intermediate position P3 correspond to a plurality of intermediate positions.

In the vicinities of the die mating surfaces 34f, 36f of the molding dies 34, 36 (on both side portions on the left and right of FIG. 7), the clamping surfaces 34a, 36a have a small displacement amount in radial directions (left and right directions of FIG. 7) perpendicular to the movement direction of the movable die 36, and the elastic return amount (diameter expansion amount) of the insulating coating 20 is small, as compared to a movement stroke of the movable die 36 in an initial stage of raising (moving upward) of the movable die 36 from the mold closing state. Therefore, a push-back amount of the insulating coating 20 pushing back the biting portion of the mold resin 38 due to the elastic return pressure is small, so that the biting cannot sufficiently be mitigated. In this regard, in this example, the compression deformation amount α of the insulating coating 20 near the die mating surfaces 34f, 36f is smaller as compared to the other portions, or in other words, the clamping surfaces 34a, 36a are made slightly elliptical so that the insulating coating 20 has a thickness D2 in both side portions larger than a thickness D1 in upper and lower portions in the mold closing state, and an amount of biting of the mold resin 38 is originally reduced. As a result, even if the push-back amount of the insulating coating 20 due to the elastic return pressure is small, a predetermined strength can be ensured for the insulating coating 20. The compression deformation amount α in both side portions of the insulating coating 20 in the mold closing state is defined within a range in which the mold resin 38 does not leak in the mold closing state although the amount is smaller than the compression deformation amount α in the upper and lower portions.

Figure 8:
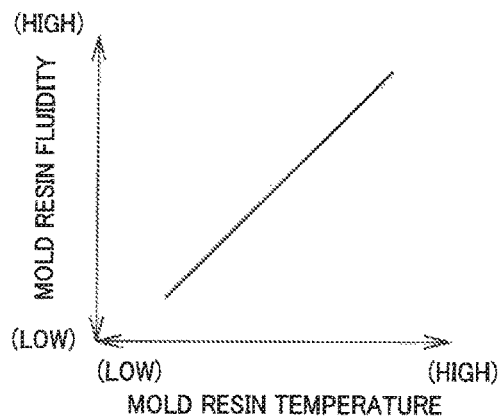
FIG. 8 is a diagram for explaining a correlation between mold resin temperature and mold resin fluidity (softness).
Figure 9:
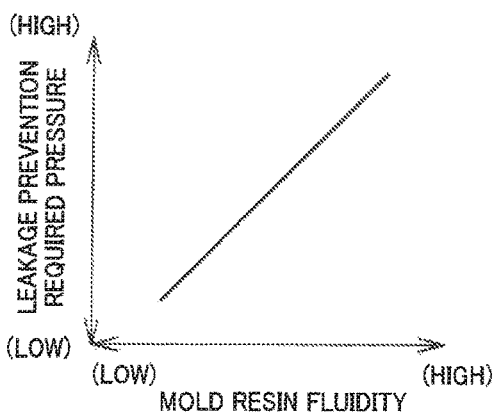
FIG. 9 is a diagram for explaining a correlation between the mold resin fluidity and leakage prevention required pressure.

The fluidity (softness) of the mold resin 38 depends on a mold resin temperature, and the fluidity decreases as the mold resin temperature decreases as shown in FIG. 8. A leakage prevention required pressure of the mold resin 38 required for preventing the leakage of the mold resin 38, i.e., a required pressing force between the insulating coating 20 and the clamping surfaces 34a, 36a, relates to the fluidity of the mold resin 38 as shown in FIG. 9, and the leakage prevention required pressure decreases as the fluidity decreases. Therefore, the leakage prevention required pressure of the mold resin 38 corresponds to the mold resin temperature, and the leakage prevention required pressure decreases as the mold resin temperature decreases. Since the leakage prevention required pressure is a pressing force between the insulating coating 20 and the clamping surfaces 34a, 36a and corresponds to the elastic return pressure of the insulating coating 20, and the elastic return pressure of the insulating coating 20 corresponds to the compression deformation amount α of the insulating coating 20, i.e., the vertical position of the movable die 36, the movable die 36 can be raised based on the mold resin temperature while preventing the mold resin 38 from leaking. Since the mold resin temperature decreases in accordance with an elapsed time after the mold resin 38 is injected and filled into the cavity 32, and the fluidity and the leakage prevention required pressure also change in accordance with the temperature decrease, the movable die 36 can be raised based on the elapsed time while preventing the mold resin 38 from leaking.

Figure 10:
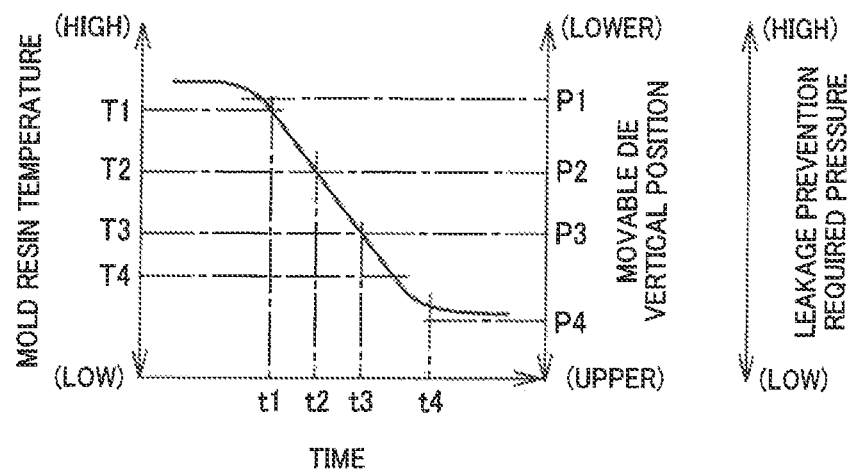
FIG. 10 is a diagram showing an example of a temperature decrease characteristic of the mold resin for explaining movable-die vertical positions P2, P3 at which the leak prevention required pressure determined in accordance with the mold resin temperature is obtained.

FIG. 10 is an example of a temperature decrease characteristic that is a relationship between the mold resin temperature and the elapsed time, and time t1 is the time of injection and filling of the mold resin 38 into the cavity 32 at the injection step, and the movable die 36 is held at the mold closing position P1, which is a downward end position, at this timing. The mold closing position P1 is a position where the insulating coating 20 is compressed and deformed such that the leakage prevention required pressure to be obtained becomes higher than the leakage prevention required pressure determined from the mold resin temperature T1 at the time of injection. Time t2 is a time of raising the movable die 36 to the first intermediate position at the first intermediate mold opening step, and the first intermediate position P2 is a position where the insulating coating 20 is elastically returned (expanded in diameter) within a range in which the leakage prevention required pressure determined from the mold resin temperature T2 at this timing is obtained. Time t3 is a time of raising the movable die 36 to the second intermediate position P3 at the second intermediate mold opening step, and the second intermediate position P3 is a position where the insulating coating 20 is elastically returned (expanded in diameter) within a range in which the leakage prevention required pressure determined from the mold resin temperature T3 at this timing is obtained. Therefore, in this example, the timing of raising the movable die 36 is determined from the elapsed time after the mold resin 38 is injected and filled into the cavity 32, based on the mold resin temperature decrease characteristic corresponding to the leakage prevention required pressure for the mold resin 38. Intervals of time t1-t2, t2-t3 can appropriately be determined such that the time intervals are made substantially the same, that temperature widths of the mold resin temperatures T1-T2, T2-T3 are made substantially the same, or that intervals between the vertical positions P1-P2, P2-P3 of the movable die 36 are made substantially the same. These time intervals, temperature ranges, and vertical position intervals may all be unequal.

The temperature decrease characteristic of the mold resin 38 can be obtained in advance by experiments etc., and this temperature decrease characteristic varies depending on the type of the mold resin 38 as well as the mold resin temperature and the temperature of the molding dies 34, 36 at the time of injection into the cavity 32. Therefore, in this example, multiple temperature decrease characteristics are set in advance by using the mold resin temperatures and the temperatures of the molding dies 34, 36 at the time of injection as parameters, and the mold resin temperatures and the temperatures of the molding dies 34, 36 at the time of injection are measured to move the movable die 36 in accordance with the corresponding temperature decrease characteristic. The insert molding of the mold portion 12 including the movement of the movable die 36 is desirably performed automatically by using a control device including a computer or may partially or entirely be performed as a manual operation by an operator.

Figure 6D:
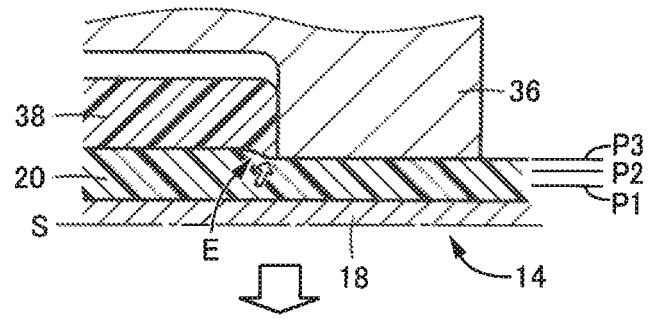
Figure 6E:
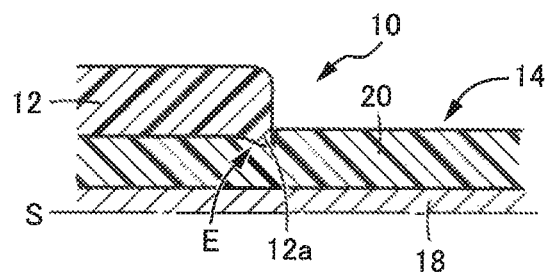

At a complete mold opening step of FIG. 6E, the movable die 36 is raised to a complete mold opening position P4 (see FIG. 10) at which the clamping surfaces 34*a*, 36*a* are separated from the insulating coating 20 so that the insulating coating 20 can completely elastically be restored after the mold resin 38 cures and becomes unable to flow. As a result, the connector portion 10 with the mold portion 12 having an intended shape is obtained. Time t4 of FIG. 10 is a time of raising the movable die 36 to the complete mold opening position P4 at the complete mold opening step and is defined as a time after the mold resin temperature becomes lower than a mold resin temperature T4 that is a complete curing temperature at which the mold resin 38 no longer flows. At this timing, since the mold resin 38 is completely cured, the biting of the boundary portion E cannot be pushed back by the elastic return of the insulating coating 20, so that an annular biting projection portion 12*a* remains as a portion projecting toward the inner circumference and biting into the insulating coating 20 at an axial end portion of the mold portion 12 due to the elastic return of the insulating coating 20; however, the biting has small dimensions and a relatively flat tip shape. As a result, a strength deterioration of the insulating coating 20 due to the biting of the mold portion 12 is reduced and the stress concentration is alleviated, and the insulating coating 20 is prevented from being damaged by bending, torsional deformation, vibration, etc. of the electric wire 14.

As described above, in the molding method of the connector portion 10 of this example, when the molding dies 34, 36 are closed so that the insulating coating 20 is compressed and deformed, and the mold resin 38 is injected and filled into the cavity 32, the mold resin 38 bites in an edge shape toward the inner circumference at the boundary portion E between the portion of clamping by the molding dies 34, 36 and the cavity 32 as shown in FIG. 6B; however, subsequently, the movable die 36 is separated upward while the mold resin 38 has fluidity as shown in FIGS. 6C and 6D, so that the biting portion of the mold resin 38 is pushed back by the elastic return pressure of the insulating coating 20 due to the separation of the movable die 36. As a result, when the movable die 36 is separated to the complete mold opening position P4 and the insulating coating 20 is completely elastically returned as shown in FIG. 6E, the biting of the biting projection portion 12*a* is mitigated at the end portion of the mold portion 12, and the strength deterioration of the insulating coating 20 due to the biting of the mold portion 12 is suppressed. Additionally, the movable die 36 is separated upward such that the leakage of the mold resin 38 is prevented by the elastic return pressure of the insulating coating 20, which eliminates the risk of leakage of the mold resin 38 from between the molding dies 34, 36 and the insulating coating 20.

The method includes the intermediate mold opening step of moving the movable die 36 to the first intermediate position P2 and the second intermediate position P3 so that the insulating coating 20 is elastically returned by the predetermined amount from the compression deformation state at the injection step while the mold resin 38 has fluidity, and the complete mold opening step of moving the movable die 36 until the insulating coating 20 is completely elastically returned after the mold resin 38 cures and becomes unable to flow, and since the biting portion of the mold resin 38 is pushed back at the intermediate mold opening step, the strength deterioration of the insulating coating 20 due to the biting of the mold portion 12 is appropriately suppressed. In this case, after the movable die 36 is moved stepwise to the first intermediate position P2 and the second intermediate position P3, the complete mold opening step may be performed after the mold resin 38 cures and becomes unable to flow, and therefore, movement control or operation of the movable die 36 is easy.

Since the first intermediate mold opening step and the second intermediate mold opening step are included as the intermediate mold opening step, and the movable die 36 is moved stepwise to the first intermediate position P2 and the second intermediate position P3, the movable die 36 can be separated step by step from when the mold resin 38 is relatively highly fluid (soft) such that leakage is prevented, so that the biting portion of the mold resin 38 can reliably be pushed back by the elastic return pressure oft insulating coating 20.

Since the movable die 36 is moved stepwise after waiting for curing to a certain degree so as not to allow the mold resin 38 to leak out, a flatness of an end surface of the mold portion 12 is increased on the tip side from which the terminal metal fitting 16 projects, as compared to when the movable die 36 is continuously moved. Since the end surface of the mold portion 12 on the tip side is exposed to the outside up to an inner circumferential edge in contact with the terminal metal fitting 16, the quality is improved by increasing the flatness.

The first intermediate position P2, the second intermediate position P3, and the times t2, t3 of the timing of moving the movable die 36 to the intermediate positions P2, P3 are determined from the elapsed time based on the predefined temperature decrease characteristic of the mold resin 38 shown in FIG. 10. Therefore, it is not necessary to measure the temperature of the mold resin 38 in the cavity 32, and the movable die 36 may be moved to the predetermined intermediate positions P2, P3 at the predetermined times t2, t3 of the timing at which the mold resin 38 does not leak based on the elapsed time, so that the movable die 36 can simply be moved. Specifically, the fluidity of the mold resin 38 and the leakage prevention required pressure depend on the temperature of the mold resin 38, and the leakage prevention of the mold resin 38 depends on the elastic return pressure of the insulating coating 20, i.e., the separation position of the movable die 36, while the temperature of the mold resin 38 changes depending on the elapsed time, the movable die 36 can be moved based on the elapsed time while preventing the mold resin 38 from leaking.

The molding device 30 is made up of a pair of the fixed die 34 and the movable die 36, and in the vicinities of the die mating surfaces 34f, 36f of the fixed die 34 and the movable die 36, the clamping surfaces 34a, 36a have the small displacement amount in radial directions (left and right directions of FIG. 7) perpendicular to the movement direction of the movable die 36, and the elastic return amount (diameter expansion amount) of the insulating coating 20 is small, as compared to a movement stroke of the movable die 36 in the initial stage of separation of the movable die 36 from the mold closing state. Therefore, the push-back amount of the insulating coating 20 pushing back the biting portion of the mold resin 38 due to the elastic return pressure is small, so that the biting cannot sufficiently be mitigated; however, in this example, the compression deformation amount α of the insulating coating 20 near the die mating surfaces 34f, 36f is smaller as compared to the other portions, and even if the push-back amount of the insulating coating 20 due to the elastic return pressure is small, a predetermined strength can be ensured for the insulating coating 20.

Figure 11:
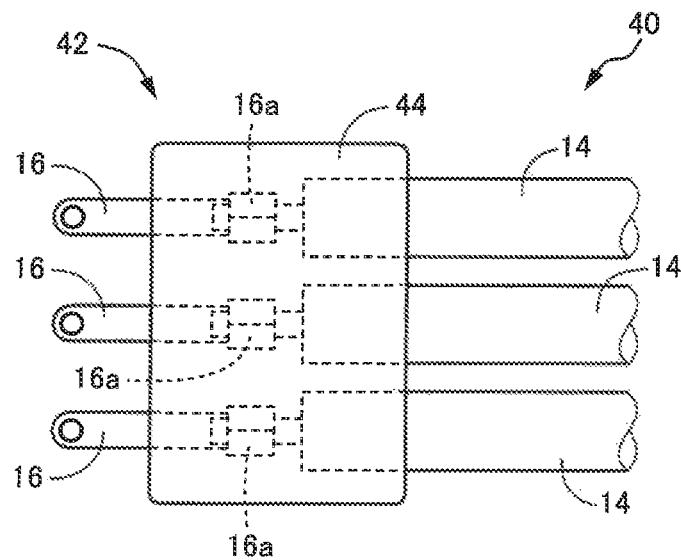
FIG. 11 is a view for explaining another example of the connector portion provided with the mold portion according to the method of the present invention and is a plan view of a connector portion of a wire harness for collectively wiring multiple electric wires.

Although the single terminal metal fitting 16 is connected to the single electric wire 14 in the connector portion 10 of the wire harness 8 described in the example, the present invention is applicable to a connector portion 42 of a wire harness 40 for collectively wiring multiple electric wires 14 joined to terminal metal fittings 16 as shown in FIG. 11, for example. Specifically, a mold portion 44 having a rectangular or oblong cross section perpendicular to the electric wire 14 is disposed on both the multiple electric wires 14 and the terminal metal fittings 16 to collectively cover multiple joining portions (crimping portions 16a) of the multiple electric wires 14. Even for the connector portion 42 as described above, the mold portion 44 can be insert-molded in accordance with the molding method shown in FIG. 6 of the example so as to suppress the edge-shaped biting of the end portion of the mold portion 44 into the insulating coating 20 of each of the electric wires 14.

Although the examples of the present invention have been described in detail with reference to the drawings, these examples are merely an embodiment, and the present invention can be implemented in variously modified and improved forms based on the knowledge of those skilled in the art.

REFERENCE SIGNS LIST 10, 42: connector portion 12, 44: mold portion 14: electric wire 16: terminal metal fitting 16a: crimping portion (joining portion) 18: core wire 20: insulating coating 32: cavity 34: fixed die (molding die) 36: movable die (molding die) 36: mold resin α: compression deformation amount P2: first intermediate position (intermediate position) P3: second intermediate position (intermediate position)

What is claimed is:

1. A molding method of a connector portion, which includes (i) an electric wire with a core wire covered with an insulating coating made of a synthetic resin such that a tip of the core wire projects from the insulating coating, (ii) a terminal metal fitting electrically joined to the core wire projecting from the insulating coating, and (iii) a mold portion made of a synthetic resin disposed on both the electric wire and the terminal metal fitting to enclose a joining portion between the core wire and the terminal metal fitting, and covering the joining portion, the molding method of insert-molding the mold portion with a plurality of molding dies forming a cavity corresponding to the mold portion, the method comprising:

an injection step of inserting the electric wire with the core wire covered with the insulating coating into the cavity and closing the plurality of molding dies so that the insulating coating is compressed and deformed, and injecting and filling a mold resin, as the synthetic resin material of the mold portion, into the cavity; and a mold opening step of separating each molding die of the plurality of molding dies in a mold opening direction while the mold resin has fluidity so that leakage of the mold resin is prevented by an elastic return pressure of the insulating coating.

2. The molding method of the connector portion according to claim 1, wherein the mold opening step includes:

an intermediate mold opening step of separating each molding die to an intermediate position in the mold opening direction while the mold resin has fluidity so that the insulating coating is elastically returned by a predetermined amount from a compression deformation state at the injection step, and a complete mold opening step of opening each molding die until the insulating coating is completely elastically returned after the mold resin cures and is unable to flow.

3. The molding method of the connector portion according to claim 2, wherein a plurality of the intermediate positions, which include the intermediate position, are defined, and each molding die is separated stepwise at the plurality of intermediate positions.

4. The molding method of the connector portion according to claim 2, wherein the intermediate position and a timing of separating each molding die to the intermediate position are determined based on an elapsed time and a temperature decrease characteristic that is a relationship between a temperature of the mold resin and the elapsed time.

5. The molding method of the connector portion according to claim 1, wherein:
- the plurality of molding dies are formed of a pair of fixed and movable dies, and
- in a closed state of the fixed die and the movable die, a compression deformation amount of the insulating coating is smaller in a vicinity of die mating surfaces of the fixed die and the movable die as compared to other portions of the insulating coating.

6. The molding method of the connector portion according to claim 1, wherein:
- the connector portion includes a plurality of electric wires, which include the electric wire, joined to a respective plurality of terminal metal fittings, which include the terminal fitting, and
- the mold portion is disposed on both the plurality of electric wires and the terminal metal fittings to collectively cover a plurality of joining portions of the plurality of electric wires.

* * * * *